US 6,622,471 B1

(12) United States Patent
Nagel

(10) Patent No.: US 6,622,471 B1
(45) Date of Patent: Sep. 23, 2003

(54) METHOD FOR DRIVING A COMBUSTION MOTOR AS WELL AS A COMBUSTION MOTOR

(76) Inventor: Edmund Ferdinand Nagel, Reichsstrasse 82, A-6800, Feldkirch (AT)

( * ) Notice: Subject to any disclaimer, the term of this patent is extended or adjusted under 35 U.S.C. 154(b) by 0 days.

(21) Appl. No.: 09/846,869

(22) Filed: May 1, 2001

(30) Foreign Application Priority Data

May 2, 2000 (AT) .............................................. 761/00

(51) Int. Cl.[7] .................................................. F02G 3/00
(52) U.S. Cl. .................... 60/39.6; 60/39.63; 123/197.4; 74/55
(58) Field of Search ............................... 60/39.6, 39.62, 60/39.63, 39.64, 39.78, 39.79, 39.8; 417/364; 123/197.4; 74/55

(56) References Cited

U.S. PATENT DOCUMENTS

| 883,511 | A | * | 3/1908 | Beaudet ...................... 60/39.6 |
| 1,370,503 | A | * | 3/1921 | Gray .............................. 74/55 |
| 1,731,778 | A | * | 10/1929 | Holzwarth ................. 60/39.79 |
| 1,783,589 | A | * | 12/1930 | Shepard ......................... 74/55 |
| 3,651,638 | A | * | 3/1972 | Goodacre ................... 60/39.6 |
| 4,212,162 | A | | 7/1980 | Kobayashi |
| 4,369,623 | A | * | 1/1983 | Johnson ....................... 60/39.6 |
| 4,848,282 | A | | 7/1989 | Chaneac |
| 5,222,466 | A | | 6/1993 | Gratziani |
| 5,297,448 | A | * | 3/1994 | Galvin ........................... 74/55 |
| 5,311,739 | A | | 5/1994 | Clark ......................... 60/39.6 |
| 5,813,372 | A | | 9/1998 | Manthey |
| 2001/0017122 | A1 | * | 8/2001 | Fantuzzi .................. 123/197.4 |

FOREIGN PATENT DOCUMENTS

| CA | 1 129 346 | 8/1982 |
| DE | 2216082 | 10/1973 |
| DE | 3135619 | 9/1982 |
| DE | 4136223 | 12/1992 |
| DE | 4232566 | 4/1994 |
| EP | 0 957 250 | 11/1999 | ................ 60/39.63 |
| FR | 2 278 912 | 2/1976 |
| SU | 1 749 554 | 7/1992 |
| WO | WO 9801338 | 1/1998 |
| WO | WO 99 44886 | 9/1999 |

OTHER PUBLICATIONS

*English Abstract of EP 0 957 250.
*English Abstract of WO 99 44886.
*English Abstract of WO 9801338.
*English Abstract of DE 4136223.
*English Abstract of DE 3135619.
*English Abstract of DE 4232566.
*English Abstract of SU 1 749 554.

* cited by examiner

Primary Examiner—Thomas Denion
Assistant Examiner—Thai-Ba Trieu
(74) Attorney, Agent, or Firm—Reed Smith LLP

(57) ABSTRACT

A method for driving a combustion motor has the following procedural steps:

Figure 1:
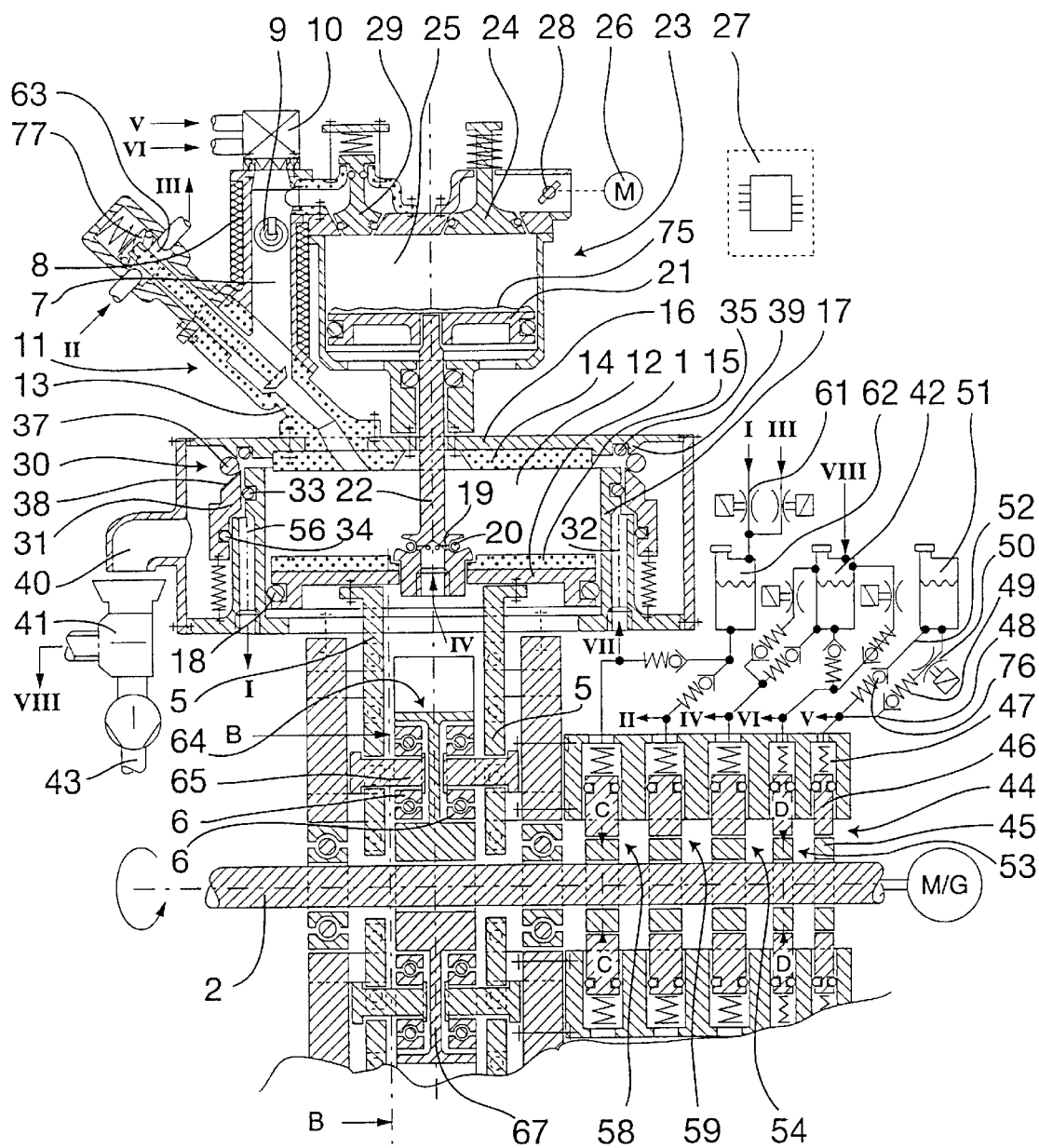

cyclical combustion of a fuel in a combustion chamber (7);

letting hot pressurized combustion gas created during the combustion flow into an expansion chamber separate from the combustion chamber where it moves a piston while expanding during an expansion phase; wherein at least for a partial load operation of the motor, the combustion gas in the expansion chamber (12) already reaches atmospheric pressure before the end of the expansion phase of the combustion gas; in consequence, the movement of the piston (1) continues in the same direction of movement while further expanding the combustion gas in the expansion chamber (12) and pressure is generated that is below atmospheric pressure;

spraying cooling liquid into the expansion chamber and into the combustion gas which is at subatmospheric pressure at the end of the expansion phase of the combustion gas; wherein the pressure of the combustion gas is reduced further and the subatmospheric pressure in the expansion chamber acts on the piston (1) and the piston performs work under the effect of this subatmospheric pressure.

23 Claims, 3 Drawing Sheets

METHOD FOR DRIVING A COMBUSTION MOTOR AS WELL AS A COMBUSTION MOTOR

The invention is directed to a method for driving a combustion motor which has a combustion chamber inside which a fuel is burned in cycles and from which the hot, pressurized combustion gas created during the combustion flows into an expansion chamber which is separate from the combustion chamber and where it moves a piston.

Furthermore, the invention is directed to a combustion motor which has a combustion chamber for the cyclical combustion of a fuel, during which a combustion gas is generated, and a separate expansion chamber which is connected with the combustion chamber via a controllable combustion chamber discharge valve and which provides a bearing for a piston that permits the movement of said piston so that the energy of the combustion gas can be converted into mechanical work or energy.

Such a method for driving a combustion motor and respectively such a combustion motor are already known from EP 0 957 250 A2. For this combustion motor, cooling water is sprayed into the expansion chamber at the end of the expansion phase when the piston is at its bottom dead center and when the combustion gas has relaxed to approximately atmospheric pressure. The low pressure caused by the sudden cooling of the hot combustion gases pulls the piston up towards its upper dead center while loading a spring. This stored energy is released to the piston during the next expansion phase when the piston is again moving from the upper to the bottom dead center. By means of spraying in a cooling liquid, the thermal energy of the hot combustion gases, which is normally discharged unused through the exhaust of customary motors without such an injection of cooling liquid, can be used to do work.

It is an important object of the invention to further improve the method of the type mentioned in the start while allowing a further increase of the efficiency of the combustion motor. According to the invention, this can be done by using a method for driving a combustion motor which has the following procedural steps:

cyclical burning of a fuel in a combustion chamber;
letting hot pressurized combustion gas created during the combustion flow into an expansion chamber separate from the combustion chamber where it moves a piston while expanding during an expansion phase; wherein at least for a partial load operation of the motor the combustion gas in the expansion chamber already reaches atmospheric pressure before the end of the expansion phase of the combustion gas; in consequence, the movement of the piston continues in the same direction of movement whilst the combustion gas in the expansion chamber expands further and pressure is generated that is below atmospheric pressure;
spraying cooling liquid into the combustion gas which is at subatmospheric pressure at the end of the expansion phase of the combustion gas; wherein the pressure of the combustion gas is reduced further and the subatmospheric pressure in the expansion chamber acts on the piston and the piston performs work under the effect of this subatmospheric pressure.

Such a thinning of the combustion gas to a value below atmospheric pressure before the implosion of the combustion gas by injection of a cooling liquid is effected has the effect of increasing efficiency; this is similar to the way in which compressing the air introduced into the combustion chamber before burning the fuel-air mix leads to higher efficiency compared to burning the fuel-air mix at atmospheric pressure. Preferably though, the pressure of the combustion gas in the expansion chamber should still be above 0.3 times atmospheric pressure immediately before the implosion phase.

In a preferred embodiment example of the invention, the compression of the air introduced into the combustion chamber is also implemented, wherein advantageously the piston is connected to the compressor piston of a compressor pump by means of a piston rod and the compression takes place during the upward movement of the piston from bottom dead center to upper dead center and is supported by the subatmospheric pressure in the expansion chamber.

The expression "expansion phase" is used for that phase during the working cycle of the motor when the volume of the expansion chamber of the motor increases and the combustion gas therefore expands (either by itself or under the effect of a force). After the injection of the cooling liquid follows the "implosion phase" during which the volume of the expansion chamber decreases while the pressure of the combustion gas increases again towards atmospheric pressure. After atmospheric pressure is exceeded, an "exhaust phase" follows during which the combustion gas is expelled from the expansion chamber. Preferably, this is to be followed by a "waiting phase" of the piston during which fuel is burned in the combustion chamber and the piston preferably to be realized as a reciprocating piston stays in its upper dead center (OT). After the combustion of the fuel in the combustion chamber which advantageously would be complete, the next expansion phase is started.

A combustion motor with an expansion chamber separate from the combustion chamber for which the combustion gas during partial load operation of the motor towards the end of the expansion phase is at a value below atmospheric pressure is already known from U.S. Pat. No. 5,311,739. This effect—here as such unwanted—occurs because the volumes of the combustion chamber and the expansion chamber are determined by the gas volume during full load operation; during partial loads, subatmospheric pressure is therefore created towards the end of the mechanically forced piston travel. By means of the measures described in U.S. Pat. No. 5,311,739, the motor can still be operated in partial load operation, in spite of this subatmospheric pressure that is being generated.

A combustion motor is advantageously suited for the embodiment of the method according to the invention which has a combustion chamber for the cyclical combustion of a fuel during which a combustion gas is generated, and a separate expansion chamber which is connected with the combustion chamber via a controllable combustion chamber discharge valve and which provides a bearing for a piston that permits the movement of said piston so that the energy of the combustion gas can be converted into mechanical work or energy, wherein at least one injection nozzle is provided that opens into the expansion chamber for the purpose of injecting a cooling liquid to decrease the volume of the expanded combustion gas suddenly; and wherein at least one roller is arranged on the piston rod of the piston as a thrust-transmitting member of a cam gear; and wherein curved surfaces of this cam gear, active in both stroke directions of the piston, are resting on both sides of this roller.

By use of this cam gear active on both sides and connected to the piston rod of the piston, the thinning of the combustion gas before the start of implosion phase can be done in an easy manner by spraying in the cooling liquid. As long as the combustion gas in the expansion chamber is under pressure above atmospheric during the movement of the piston from upper dead center to bottom dead center, a thrust-transmitting member in the shape of a roller connected to the piston rod acts on the curved surface that is further away from the piston. As soon as the pressure of the combustion gas in the expansion chamber drops below atmospheric pressure, the curved surface that is closer to the piston acts upon this thrust-transmitting member while the downward movement of the piston is being supported and the pressure of the combustion gas in the expansion chamber falls below atmospheric pressure. The energy required for thinning the combustion gas is drawn from the kinetic energy of the system. This loss of energy, though, is more than compensated for by the fact that the pressure in the expansion chamber keeps on dropping further in the subsequent implosion phase after the injection of the cooling liquid than it would have done without such a thinning and that therefore more work is performed in the implosion phase during the travel of the piston from bottom dead center to upper dead center. This work done in the implosion phase can be transmitted via the cam gear directly to the shaft driven by the cam gear. In a preferred embodiment example of the invention, a compressor pump is driven by the piston during its upward movement. If the energy available during the implosion phase is not sufficient by itself to drive the compressor pump, kinetic energy is again withdrawn from the system by means of the cam gear. If on the other hand the power available during the implosion phase is above the drive power necessary for the compressor pump, the additional power is transmitted via the cam gear to the shaft driven by the cam gear.

A method for driving a combustion motor according to the invention or rather the combustion motor according to the invention are advantageously suited for operating the combustion motor at a partial load. For this, the combustion motor according to the invention can, for example, be realized in such a manner that the thinning of the combustion gas (=pressure drop to below atmospheric) before the start of the implosion phase does not happen during full load operation of the motor. If on the other hand it is operated at a partial load when smaller amounts of fuel and air are introduced into the combustion chamber, the combustion gas is thinned before the bottom dead center of the piston is reached. Because of the lower compression in the combustion chamber, the efficiency during the expansion phase drops while the efficiency during the implosion phase increases because of the thinning of the combustion gases. In all, a more balanced efficiency can be attained by means of this for the full and partial load operation of the motor.

A motor according to the invention that can be operated at full and partial load furthermore permits a much easier control of the combustion motor when compared with the combustion motor known from EP 0 957 250 A2. For the motor according to the invention, the motor control (control of the hydraulic valves and of the water and fuel injection) can be done by a simple cam action pump, since the hydraulic impulses (pressure impulses) must always happen within a defined segment of the rotation and no variable control times or variable rotation angles occur. Furthermore, the starting of the motor can be done in a simple manner by means of an alternator (=starter motor and generator in one) acting on the cam shaft, wherein the stroke of the compressor piston of the compressor pump is also forcibly started via the cam gear and the piston of the expansion chamber so that the necessary starter air pressure is charged in the combustion chamber without the need for a separate starter air pump.

For stationary engines constantly operated at full load, the thinning of the combustion gas according to the invention is provided for the full load operation of the motor before the implosion phase, but a thinning of the combustion gas before the start of the implosion phase can also be done advantageously for motors operated at both partial and full load when they are in full load operation.

The usable effect of thinning the combustion gas to a pressure below the surrounding atmospheric pressure before the start of the implosion phase is subsequently to be illustrated in two dimensioned examples for comparison. In both examples it is assumed that the expansion of the combustion gas, for example determined by a partial load of the motor, has progressed to atmospheric pressure after half the piston stroke of the expansion phase.

In the first sample case, the implosion is started after atmospheric pressure is attained in the expansion cylinder—the piston stroke is not executed all the way to bottom dead center. Therefore, the implosion can only have an effect during half of the stroke length (minus the partial distance for the exhaust stroke shortly before upper dead center). In the second sample case, the stroke is finished all the way to bottom dead center, which causes subatmospheric pressure in the expansion cylinder, and for which thinning work of the piston, work must be applied to this piston. The exhaust gas is cooled by the injection of the cooling liquid into the expansion cylinder at bottom dead center. Because of the subatmospheric pressure already existing before the implosion because of the thinning, the total subatmospheric pressure of the implosion reaches a lower value than in the first sample case without thinning before the implosion.

From the work capacity of this additional part of the pressure below the implosion pressure of the first sample case alone, the power added at the end of the expansion stroke for the thinning of the exhaust gas is approximately regained during the implosion stroke. The subatmospheric pressure of the implosion effective as work for compression and at the most partially effective as work given off to the outside remaining after this, now has—in contrast to the first sample case—not only an effect during half the stroke length but during the entire stroke (minus the part for the exhaust stroke). The implosion power is therefore approximately doubled in the sample cases, meaning: when the preceding expansion phase is in the partial load range, the usable power from the implosion phase for the second sample case is approximately the same as it is when the preceding expansion phase is operated at full load.

From this furthermore follows: The most advantageous area for reaching atmospheric pressure of the combustion gas so that the thinning which is the object of the invention can be utilized is in the area around the middle of the piston stroke. If the state of the combustion gas of being at atmospheric pressure was attained close to upper dead center, the effort (work added) needed for thinning the exhaust gas until the bottom dead center is reached would increase out of all proportion when compared with the work to be gained from the subsequent implosion phase. If on the other hand the combustion gas were to reach atmospheric pressure close to bottom dead center, the thinning could barely take place through lack of further travel of the piston.

Figure 2:
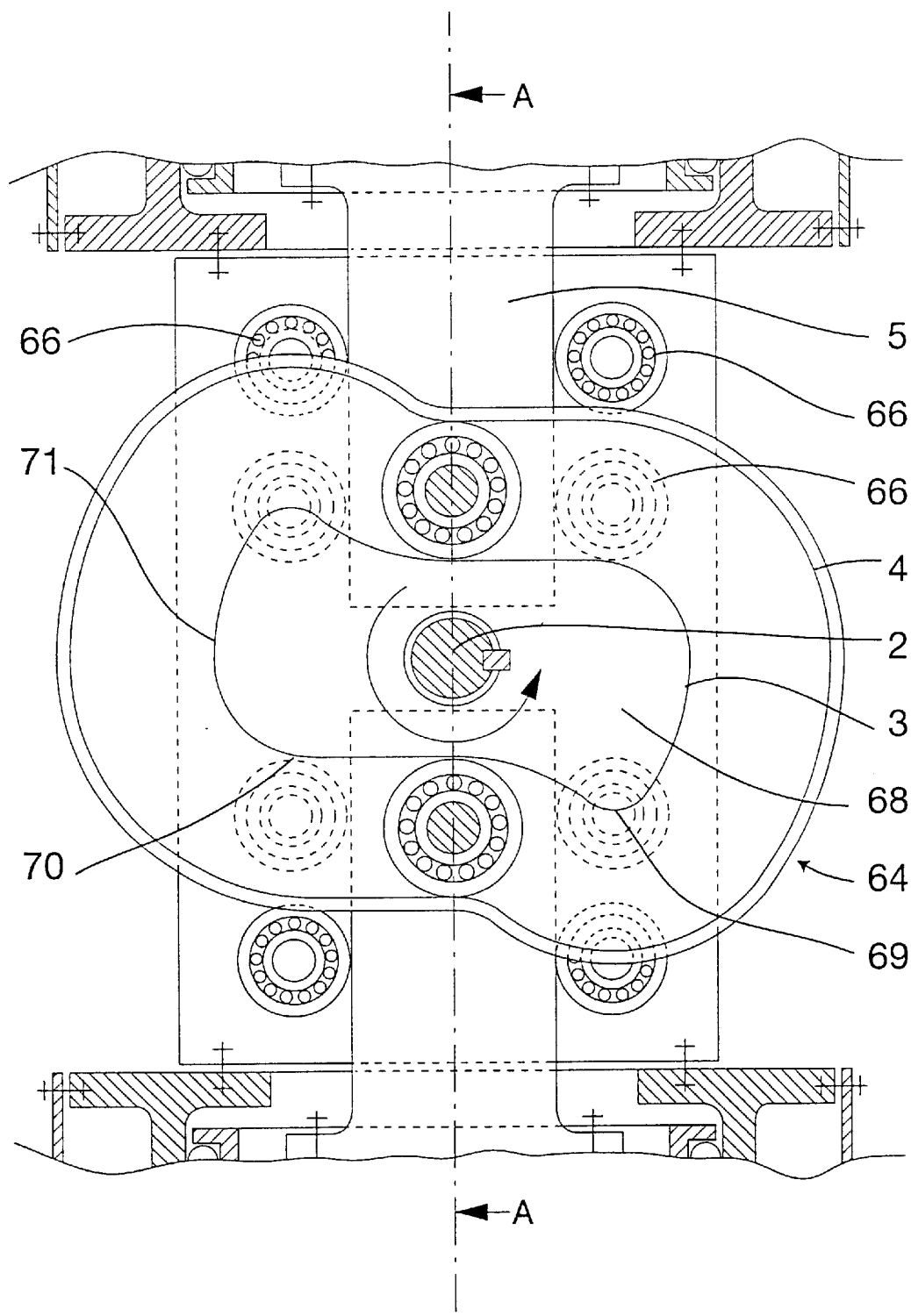
Figure 3:
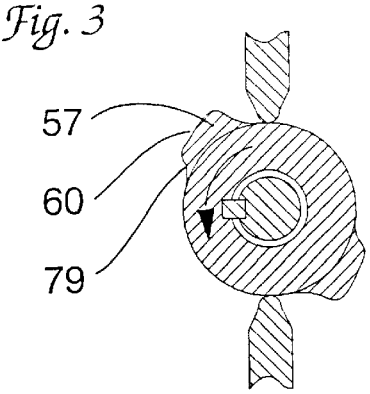
Figure 4:
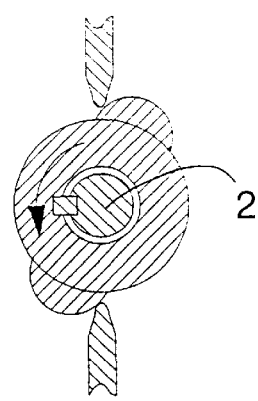
Figure 5:
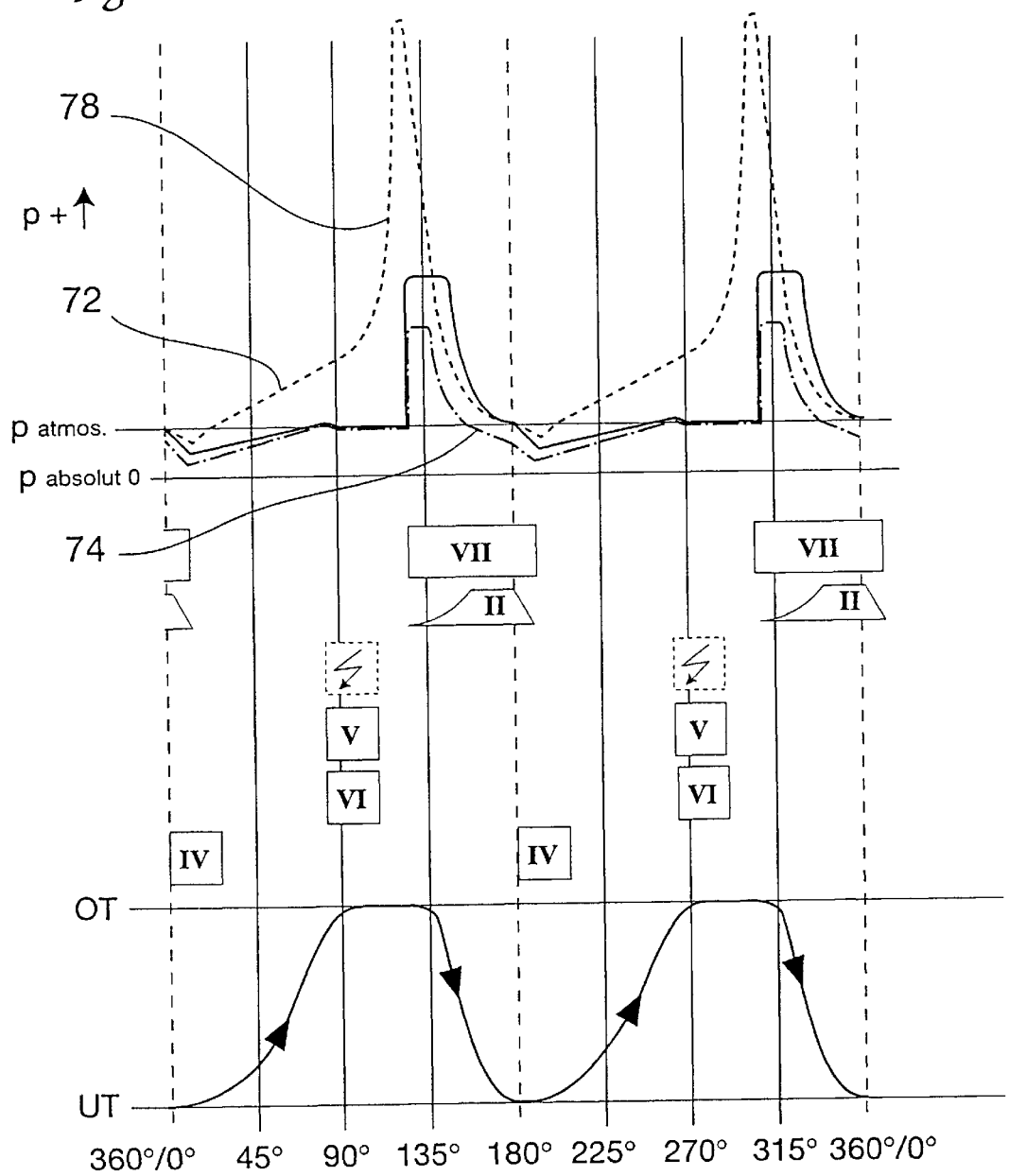

Further advantages and details of the invention are subsequently to be described by means of the accompanying drawing showing a preferred embodiment form of the invention in a diagrammatic form from which further objects of the invention will emerge. In the drawing:

FIG. 1 shows a diagrammatic section through a combustion motor according to the invention along the longitudinal central axis of the piston (or the line A—A in FIG. 2);

FIG. 2 shows a section along the line B—B in FIG. 1;
FIG. 3 shows a section along the line C—C in FIG. 1;
FIG. 4 shows a section along the line D—D in FIG. 1 and
FIG. 5 shows a diagram representing the stroke-cycle of the motor.

The combustion motor according to the invention preferably has at least two pistons 1 running synchronously which act upon the driven shaft 2 from two opposite sides. One, two, or more pairs of such pistons 1 running in synchronous stroke on sides opposing each other could here be provided. At least the opposing pistons or also all pistons could here act upon the shaft 2 via the same inner and outer curved surfaces 3, 4 and their own respective thrust transmitting member in the shape of rollers 6 arranged on the piston rods 5, as is to be illustrated in the subsequent description.

Each piston 1 has been assigned at least one combustion chamber 7 for the cyclical burning of a fuel. The combustion chamber is surrounded by a casing made of a heat insulating material 8. The ignition of the fuel-air mix is only done by means of a spark-plug 9 during the start phase. During continuous operation, the walls of the combustion chamber 7 heat up to above the spontaneous ignition temperature of the fuel (to above 700 degrees Celsius) and the ignition of the fuel takes place directly upon its injection into the combustion chamber 7 when it meets its walls. Preferably, water is to be injected together with the fuel to lower the combustion temperature, which leads to a reduction of NOx. In FIG. 1, the injection nozzles for the fuel and the water are only shown schematically as a unit 10, the delivery of fuel being indicated by arrow V and the delivery of water being indicated by arrow VI.

The combustion chamber 7 is connected via a controllable combustion chamber discharge valve 11 to an expansion chamber 12; the latter is separate from the combustion chamber 7 and realized as the inner space of a cylinder providing a bearing for the piston 1 allowing it to move. The combustion chamber discharge valve can be opened slowly or with a delay—this will be described in more detail below—and it therefore works as a throttle valve for the hot pressurized combustion gas created by the burning of the fuel which flows from the combustion chamber 7 into the expansion chamber 12 when the combustion chamber discharge valve 11 is opening. By means of this, the pressure peaks acting on the piston 1 and the other movable parts of the combustion motor are largely reduced so that the construction of the motor (in particular of the gaskets) becomes simpler and wear is reduced. The additional heating of the combustion gas occurring because of the throttle effect of the combustion chamber discharge valve 11 does not lead to a significant reduction of efficiency, since the thermal energy of the combustion gas is also used during the implosion phase detailed below. To avoid convection losses in the area of the combustion chamber discharge valve, those of its parts that come into contact with the hot combustion gas (their sectional surfaces are shown as a dotted line in FIG. 1) are made of a heat insulating material, preferably a type of ceramic material. The area of the combustion chamber discharge valve could also be enclosed by a heat-insulating casing on the outside of the combustion motor.

To avoid heat losses, the section of ducting 13 leading from the combustion chamber discharge valve 11 to the expansion chamber 12 is also made of a heat-insulating material (or surrounded by heat insulation). Furthermore, a heat-insulating layer 14, 15 preferably consisting of a ceramic material is also to be provided on the inside of the cylinder head 16 and on the top side of the piston 1 facing the expansion chamber 12. Only the cylinder wall 17 has no such heat insulation; quite to the contrary, it is water-cooled by internal water cooling which is to be detailed below. Because of this, a piston gasket 18 can be used that is made of plastic, preferably graphite-Teflon which is permanently temperature stable up to 250 degrees Celsius. Such a piston gasket 18 can be water-lubricated.

When the piston 1 has reached bottom dead center UT, water is injected into the expansion chamber 12 through a number of injection nozzles 19 arranged in a ring-shape in the piston rod 22 to induce an implosion phase. This cooling liquid is sprayed onto the cylinder wall 17 where it forms a water film to cool the cylinder wall 17 and to lubricate the piston gasket 18. The injection nozzles 19 are surrounded by an elastic O-ring 20 forming a self-closing injection back pressure valve.

The subatmospheric pressure in the expansion chamber 12 after the injection of the cooling liquid on the one hand serves for the flushing of the combustion chamber 7, on the other hand, the piston 1 is pulled up towards its upper dead center OT because of it. The piston 1 is connected to the compressor piston 21 of a compressor pump 23 formed by a piston-cylinder unit via the piston rod 22. During the downward movement of the piston 1 and the compressor piston 21 connected to it, the air inlet valve 24 realized as a self-closing back pressure valve opens and air flows into the cylinder space 25. Depending on the amount of air needed (depending on the momentary power output of the motor), a throttle 28 is closed more or less by a motor operator 26 driven by a motor control set-up 27. If the throttle 28 is partially closed, a vacuum that depends on the position of the throttle 28 is formed in the cylinder space 25 during the downward movement of the piston 1 and the amount of air available during the subsequent upward movement of the compressor piston 21 is therefore smaller. During the upward movement of the piston 1 and the compressor piston 21 connected to it, the air discharge valve 29 realized as a self-closing back pressure valve opens, and a corresponding amount of air which leads to a corresponding compressor pressure is pressed into the combustion chamber 7. A pad 75 made of a deformable material is arranged on the compressor piston 21 so that at the top position of this piston all air is pressed out of the cylinder space 25, since otherwise this would act as a pneumatic spring causing unnecessary friction.

While the piston 1 is moving from its bottom dead center UT towards its upper dead center OT, the combustion gas, which at first is at subatmospheric pressure, is compressed in the expansion chamber until its pressure finally rises to above atmospheric pressure and it can flow out through the expansion chamber discharge valve 30 during the exhaust phase.

The expansion chamber discharge valve 30 comprises an actuator 31 which encloses the cylinder wall 17 in a ring-shape and can be moved under application of hydraulic pressure from its downwards preloaded position along the cylinder wall 17 towards the cylinder head 16. For this purpose, a hydraulic pipeline 32 is provided which opens into a chamber sealed with O-rings 33, 34. Pressurizing the hydraulic pipeline 32 moves the actuator upwards pushing it with its free end against a sealing washer 35 arranged in a ring-shaped groove in the cylinder head 16 so that the expansion chamber discharge opening 36 is closed by the actuator 31. This expansion chamber discharge opening 36 is realized as a ring-shaped gap between the cylinder head 16 and the cylinder wall 17. This closure of the expansion chamber discharge valve 30 by means of the actuator 31 takes place during the downward movement of the piston 1 from upper dead center to bottom dead center so that the pressurized combustion gas is enclosed in the expansion chamber 12.

When the hydraulic pipeline 32 is not pressurized, the actuator 31 is in a position where it is preloaded downwards. On the outside of the actuator 31 and in front of the expansion chamber discharge opening 36 an elastic O-ring 37 has been arranged which on one side supports itself on a wedge surface 38 on the outside of the actuator 31 and on another side supports itself on a ring-shaped extension 39 of the cylinder head 16. This O-ring 37 therefore forms a self-closing back pressure valve when the actuator 31 is open. When the pressure of the combustion gas rises above atmospheric when the piston 1 is moving upwards, the self-closing back pressure valve formed by the O-ring 37 is therefore opened and the combustion gas/water-mix can flow out of the expansion chamber 12. Via a section of ducting 40, it reaches a water separator 41 which could be constructed analogous to the water separator described in EP 0 957 250 A2. Indicated by the arrow VIII, the cooling water is recirculated into the water tank 42 and the combustion gas can flow out through the exhaust 43.

Next follows the description of the cam control of the combustion motor. The injection of the fuel into the combustion chamber 7 is done by the cam pump 44. When the cam arranged on the cam disk 45 meets the plunger piston 46 and pushes it into the cylinder space 47, one part of the fuel present here is injected into the combustion chamber 7 via the pipeline indicated by a V and through the injection nozzle provided in the unit 10, and the other part of it is recirculated into the fuel tank 51 via the pipeline 48, the back pressure valve 49 and the throttle valve 50 adjustable by the motor control 27. Depending on to which degree the throttle valve 50 is open, a variable amount of the fuel is returned to the fuel tank 51 and the respective remaining amount is injected into the combustion chamber 7. After the cam arranged on the cam disk 45 has moved past the plunger piston 46, the latter moves out of the cylinder space 47 again (preloading by a spring) and the cylinder space 47 fills up again with fuel via the pipeline 52 in which the back pressure valve 76 is arranged.

The cam pump 53 for the water injection into the combustion chamber 7 and the cam pump 54 for the injection of the cooling water into the expansion chamber 12 function in an analogous manner. The cams 55 of all these cam disks 45 are realized in analogy to the section shown in FIG. 4.

To avoid heating up the hydraulic oil used for the control of the actuator 31 of the expansion chamber discharge valve 30 too much, a returning hydraulic line 56 is provided besides the hydraulic supply line 32 so that a closed circulation of hydraulic fluid is made possible. Adjacent to a steeply rising flank 79 which moves the actuator 31 into the closed position, the cam 57 of the cam pump 58 shown in a sectional view in FIG. 3 has for this purpose a slowly rising flank 60 to compensate for the outflow through the returning hydraulic line 56 along the line indicated with I and through the throttle 61 and to hold the actuator 31 in the open position during the entire travel of the cam 57 while hydraulic fluid flows into the hydraulic tank 62 according to the arrangement of the ducting VII, 32, 56, 1.

The combustion chamber discharge valve is opened via the cam pump 58. The corresponding cam is realized similarly to the cam 60 shown in FIG. 3 but with a less steeply rising flank 59 so that the combustion chamber discharge valve is opened slowly. In the opened state of the combustion chamber discharge valve, hydraulic fluid also flows by means of a rising flank corresponding to the flank 60 of the cam 57 from the cam pump 58 via the pipeline indicated with II and the pipeline indicated with III through the cylinder space 63 of the combustion chamber discharge valve 11 into the hydraulic tank 62 while the piston 77 preloaded into the closed position of the combustion chamber discharge valve 11 is held open.

The piston rod 5 of the piston 1 is divided in two and formed by two rods which lie on both sides of the cam disk 64 with its inner and outer curved surfaces 3, 4. On the two sides of the rods of the cam rod 5 facing each other, rollers 6 are arranged between the two curved surfaces 3, 4 on axles 65 which are their bearings. Here, the distance between the two curved surfaces 3, 4 is slightly greater that the diameter of the rollers so that the rollers 6 acting as thrust transmitting members for the cam gear can roll either on the inner curved surface 3 or on the outer curved surface 4. When the rollers 6 roll on the inner curved surface 3 during the downward movement of the piston 1 from upper dead center to bottom dead center, energy is added to the shaft 2 (because of the pressure of the expanding combustion gas being above atmospheric); if the rollers 6 roll on the outer curved surface 4 during the downward movement, the shaft 2 drives the piston 1 (for example during the thinning of the combustion gas in the expansion chamber 12). During the upward movement of the piston 1 from bottom dead center towards upper dead center the energy transfer onto the shaft 2 occurs when the rollers 6 roll on the outer curved surface 4 and the removal of energy takes place when the rollers 6 roll over the inner curved surface 3.

The inner and outer curved surfaces 3, 4 are both closed-periphery surface areas. Between both rollers 6, a fixed link 67 is arranged that connects the two curved surfaces 3, 4. The inner curved surface 3 is formed by the peripheral surface of a cam disk 68 rigidly attached to the shaft 2. The distance between the inner and the outer curved surfaces 3, 4 is constant along the periphery of these curved surfaces 3, 4. The curved surfaces 3, 4 both have three sections along their periphery which are to be explained using the inner curved surface 3. In the first section 69, the distance of the curved surface from the center of the shaft 2 first decreases quickly and then more slowly. This first section is assigned to the downward movement of the piston from upper dead center to bottom dead center. The initially quick decrease of the distance here corresponds to the initially quick fall of pressure inside the expansion chamber. In the following second section 70 the distance of the curved surface 3 from the center of the shaft increases again. This section is assigned to the upward movement of the piston from bottom dead center to upper dead center. The portion of the periphery of the curved surface taken up by section 69 is smaller than the one for the second section 70; preferably, the angular extent of section 70 is approximately 1.5 to 2.5 times greater than the one of the first section 69 and in the range between 80 degrees and 120 degrees. Because of this, the downward movement of the piston from upper dead center to bottom dead center is faster than its upward movement from bottom dead center to upper dead center. This has the consequence of reducing the exchange time for the convection transfer of heat by means of which the heat losses of the motor are reduced. A downward movement of the piston that is faster than its upward movement is possible without any problems, since the pressure difference to atmospheric pressure is on average greater during the expansion phase than during the implosion phase.

Adjacent to the second section 70 follows a third section 71 which has a constant maximal distance to the center of the shaft 2. For this reason, the piston remains motionless in the upper dead center while the rollers 6 run over this section 71 of the curved surface ("waiting phase"). During this time, the complete combustion of the fuel can take place in the combustion chamber 7. The angular extent of the third section 71 is adapted to the time necessary for this (depending amongst other things on the fuel used).

The three sections 69, 70, 71 are provided twice along the periphery of the curved surface 3 so that two complete working cycles or stroke cycles of the motor take place for each complete rotation of the shaft 2. The outer curved surface 4 is divided in an analogous manner into sections corresponding to sections 69, 70, 71.

The two rods of the piston rod 5 are arranged in bearings on their two opposing sides by means of bearing rollers 66.

The stroke cycle of the combustion motor is subsequently to be explained using the diagram shown in FIG. 5. Three partial diagrams are shown sharing a common ordinate dimensioned with the angular degree of the rotation of the shaft 2. The uppermost dashed line in the uppermost partial diagram represents the theoretical pressure profile in the combustion chamber 7. The continuous line represents the pressure profile in the expansion chamber 12 during full-load operation of the motor, while the dot-dash line represents the pressure profile inside the expansion chamber 12 for a partial-load operation of the motor. The two horizontal reference lines in this pressure diagram refer to atmospheric pressure and absolute zero pressure. During the linearly rising part 72 of the pressure profile in the combustion chamber 7, the compression of fresh air by the compressor pump 23 takes place in the combustion chamber 7.

The central partial diagram shows schematically the separate control processes depending on the angular position of the shaft 2. The bottom partial diagram shows the course of the piston between its bottom dead center UT and its upper dead center OT.

During the compression of the fresh air in the combustion chamber 7, the piston 1 moves towards its upper dead center OT. As soon as it has reached it, or shortly before, the injection of water and fuel into the combustion chamber 7 takes place which is indicated by the bars with the reference numbers V and VI. An ignition by means of the spark plug 9 entered in the diagram as a dashed line (lightning symbol) only takes place during a cold start of the combustion motor. During the cold start of the motor, the piston 1 is driven by the alternator 73, which at this point in time operates as a motor; during continuous operation, on the other hand, it operates as a generator.

Because of the ignition of the fuel-air mix, there is a sharp rise in pressure in the combustion chamber 7 which corresponds to area 78 of the pressure profile in the combustion chamber. After the complete burn-up of the fuel-air mix during which the piston 1 is still in its upper dead center OT, the expansion chamber discharge valve 30 is closed (bar VII in FIG. 5) and the combustion chamber discharge valve 11 is slowly opened (bar II in FIG. 5). Because of this, the pressure in the expansion chamber 12 at first rises quickly and then drops again slowly while the piston 1 is moving downwards. For the embodiment example according to FIG. 5, the pressure in the expansion chamber 12 during full load operation of the motor has just dropped to atmospheric pressure when the piston 1 has reached bottom dead center UT. If the motor is in partial load operation, though, atmospheric pressure is already reached while the piston 1 is still on its way from upper dead center to bottom dead center. In consequence, pressure in the expansion chamber 12 during partial load operation falls below atmospheric pressure, preferably below 0.8 times atmospheric pressure corresponding to section 74 on the dot-dashed line in FIG. 5. The combustion gas is "thinned" by this before the implosion phase is started. The implosion phase is started by injection of cooling water into the expansion chamber 12 as soon as the piston 1 has reach bottom dead center UT, as it has been indicated by the bar IV in FIG. 5. Because of the sudden cooling of the combustion gas, pressure in the expansion chamber 12 drops even further; even for full load operation of the motor it is now below atmospheric pressure. The piston 1 is pulled upwards by this subatmospheric pressure and now moves from bottom dead center towards upper dead center. During this movement, the combustion chamber discharge valve 11 is at first still held open so that the charge exchange of the combustion chamber 7 is possible. When the combustion chamber discharge valve 11 is closed after the combustion gas has been suctioned out of the combustion chamber 7 by means of the subatmospheric pressure in the expansion chamber 12, the actuator 31 of the expansion chamber discharge valve 30 is also opened, which can be seen from the end of the bar VII. This is followed by a further upward movement of the piston during which the fresh air in the combustion chamber 7 is compressed, and the pressure in the expansion chamber 12 furthermore rises towards atmospheric pressure. Shortly before the piston 1 reaches upper dead center, the pressure in the expansion chamber 12 rises above atmospheric pressure and the combustion gas-water mix contained in the expansion chamber 12 is pressed out through the expansion chamber discharge valve 30 ("exhaust phase"). When the upper dead center of the piston 1 is reached, or shortly before this, the next ignition of the fuel in the combustion chamber 7 takes place. Until this is burned completely, the piston remains in its upper dead center ("waiting phase"), whereupon the next expansion phase is started by opening the discharge valve 11.

For the embodiment example shown in FIG. 5, the thinning of the combustion gas in the expansion chamber 12 to below atmospheric pressure only happens during a partial load operation of the motor with the intention of approximating to each other as much as possible the efficiencies of the full load operation of the motor and of the partial load operation of the motor. To increase the efficiency of the motor during full load operation, a thinning of the combustion gas could also be provided during full load operation. This is particularly advantageous for motors that are mostly or only run in full load operation (for example stationary engines).

As can be gathered from the preceding description, the remit of the invention is not limited to the shown embodiment examples but should be determined with reference to the accompanying claims in conjunction with their full range of possible equivalents.

1 Piston
2 Shaft
3 Inner curved surface
4 Outer curved surface
5 Piston rod
6 Roller
7 Combustion chamber
8 Heat insulating material
9 Spark plug
10 Unit
11 Combustion chamber discharge valve
12 Expansion chamber
13 Section of ducting -continued 14 Heat insulating layer
15 Heat insulating layer
16 Cylinder head
17 Cylinder wall
18 Piston gasket
19 Injection nozzle
20 O-ring
21 Compressor piston
22 Piston rod
23 Compressor pump
24 Air inlet valve
25 Cylinder space
26 Actuating motor
27 Motor controls
28 Throttle valve
29 Air discharge valve
30 Expansion chamber discharge valve
31 Actuator
32 Hydraulic pipeline
33 Sealing washer
34 Sealing washer
35 Sealing washer
36 Expansion chamber discharge opening
37 O-ring
38 Wedge surface
39 Extension
40 Section of ducting
41 Water separator
42 Water tank
43 Exhaust
44 Cam pump
45 Cam disk
46 Plunger piston
47 Cylinder space
48 Circuit shorting line
49 Back pressure valve
50 Throttle valve
51 Fuel tank
52 Line
53 Cam pump
54 Cam pump
55 Cam
56 Hydraulic line
57 Cam
58 Cam pump
59 Cam pump
60 Flank
61 Throttle
62 Hydraulic tank
63 Cylinder space
64 Cam disk
65 Axle
66 Bearing roller
67 Fixed link
68 Cam disk
69 First section
70 Second section
71 Third section
72 Area
73 Alternator
74 Section
75 Pad
76 Back pressure valve
77 Piston
78 Area
79 Flank

What is claimed is:

1. A method for driving a combustion motor comprising the following steps:

providing cyclical combustion of a fuel in a combustion chamber;

letting hot pressurized combustion gas created during the combustion flow into an expansion chamber separate from the combustion chamber where it moves a piston while expanding during an expansion phase; wherein at least for a partial load operation of the motor the combustion gas in the expansion chamber already reaches atmospheric pressure before the end of the expansion phase of the combustion gas; in consequence, the movement of the piston continues in the same direction of movement while further expanding the combustion gas in the expansion chamber and pressure is generated that is below atmospheric pressure; and spraying cooling liquid into the expansion chamber and into the combustion gas which is at subatmospheric pressure at the end of the expansion phase of the combustion gas; wherein the pressure of the combustion gas is reduced further and the subatmospheric pressure in the expansion chamber acts on the piston and the piston performs work under the effect of this subatmospheric pressure.

2. The method according to claim 1, wherein the pressure of the combustion gas in the expansion chamber immediately before the cooling liquid is sprayed in is below 0.8 times atmospheric pressure.

3. The method according to claim 1, wherein the piston is realized as a reciprocating piston which is slidably arranged in the expansion chamber which is formed as a cylinder and wherein a controllable combustion chamber discharge valve is provided between the expansion chamber and the combustion chamber which is opened after the combustion of the fuel in the combustion chamber is essentially completed and while the piston is in the area of its upper dead center.

4. The method according to claim 3, wherein the cooling liquid is sprayed in when the piston is in the area of its bottom dead center.

5. The method according to claim 3, wherein the piston is connected to the compressor piston of a compressor pump via a piston rod for the purpose of compressing air in the combustion chamber, and wherein the compression takes place during the upward movement of the piston from bottom dead center to upper dead center and is effected or supported by the subatmospheric pressure in the expansion chamber.

6. The method according to claim 3, wherein at least one roller is arranged on the piston rods of the piston which forms a thrust transmitting member of a cam gear, wherein curved surfaces of the cam gear active in both stroke directions of the piston are in contact with the roller on both sides.

7. The method according to claim 6, wherein the curved surfaces have a first section assigned to the downward movement of the piston from upper dead center to bottom dead center, a second section assigned to the upward movement of the piston from bottom dead center to upper dead center, and a third section in which the curved surfaces have a constant distance form the center of the shaft around which they extend as a closed circumference and which section is assigned to the position of the piston in its upper dead center, wherein the angular extent of the third section is adapted to the duration of the combustion of the fuel in the combustion chamber, providing just enough time for the complete combustion of the fuel.

8. The method according to claim 1, wherein the pressure of the combustion gas in the expansion chamber immediately before the cooling liquid is sprayed in is above 0.3 times atmospheric pressure.

9. The method according to claim 1, wherein the pressure of the combustion gas in the expansion chamber immediately before the cooling liquid is sprayed in is also below atmospheric pressure when the motor is in full load operation.

10. The method according to claim 9, wherein the pressure of the combustion gas in the expansion chamber immediately before the cooling liquid is sprayed in is below 0.9 times atmospheric pressure when the motor is in full load operation.

11. A combustion motor comprising:
a combustion chamber for the cyclical combustion of a fuel during which a combustion gas is generated;
a separate expansion chamber which is connected to the combustion chamber via a controllable combustion chamber discharge valve; and
a slidingly arranged piston being provided for converting the energy of the combustion gas into mechanical work or energy;
at least one injection nozzle being provided that opens into the expansion chamber for the purpose of injecting a cooling liquid to decrease the volume of the expanded combustion gas suddenly; and
at least one roller being arranged on the piston rod of the piston as a thrust-transmitting member of a cam gear and curved surfaces of this cam gear active in both stroke directions of the piston are resting on both sides of this roller.

12. The combustion motor according to claim 11, wherein the combustion chamber discharge valve is realized as a throttle valve that can be opened with a delay time and the portions of this combustion chamber discharge valve contacted by the hot combustion gas consist of a heat insulating material, preferably a type of ceramic material, or are enclosed by a heat insulating jacket on the outside of the combustion motor.

13. The combustion motor according to claim 11, wherein a cam pump is provided for the hydraulic actuation of the combustion chamber discharge valve, which pump is actuated by a cam arranged on a shaft driven via the cam gear and connected to a hydraulic-cylinder unit of the combustion chamber discharge valve which actuates the combustion chamber discharge valve, wherein the cam has a slowly rising surface for the gradual opening of the combustion chamber discharge valve.

14. The combustion motor according to claim 13, wherein a throttle is to be provided in the hydraulic fluid return line from the cylinder space of the hydraulic-cylinder unit of the combustion chamber discharge valve to the hydraulic tank.

15. The combustion motor according to claim 13, wherein a cam pump is provided for the injection of fuel into the combustion chamber which is operated by a cam arranged on a shaft driven by the cam gear and which is connected to an injection nozzle opening into the combustion chamber; wherein a circuit shorting line, arranged in which there is a controllable throttle valve is provided between the cam pump and the fuel tank for controlling the amount of fuel injected.

16. The combustion motor according to claim 13, wherein a cam pump is provided for the injection of the implosion water into the expansion chamber and driven by a cam which is arranged on a shaft driven by the cam gear, and which is connected to an injection nozzle for spraying the cooling water into the expansion chamber; wherein a circuit shorting line arranged in which there is a controllable throttle valve is provided between the cam pump and the water tank for the control of the amount of cooling liquid injected.

17. The combustion motor according to claim 13, wherein an expansion chamber discharge valve for enclosing the combustion gas and discharging the combustion gas from the expansion chamber comprises an elastic O-ring enclosing the outside of one or more expansion chamber discharge openings, and the valve seat of which is formed on one side by an extension of the cylinder wall or the cylinder head and on the other side by a wedge surface of an actuator, the latter being movable between a first, open position of the expansion chamber discharge opening and a second, closed position of the expansion chamber discharge opening by applying hydraulic fluid to it.

18. The combustion motor according to claim 13, wherein for the purposes of reducing convection heat losses of the hot combustion gas in the expansion chamber, the curved surfaces of the cam gear have a first section assigned to the downward movement of the piston from upper dead center to bottom dead center and a second section assigned to the upward movement of the piston form bottom dead center to upper dead center, and wherein the angular extent of the second section of the curved surface is 1.5 times to 2.5 times greater than the angular extent of the first section of the cam gear.

19. The combustion motor according to claim 18, wherein the curved surfaces have a third section in between a second section and a first section where the curved surface is at a constant distance to the center of the shaft around which it extends as a closed periphery, and which section is assigned to the position of the piston in its upper dead center.

20. The combustion motor according to claim 11, wherein the combustion motor has at least two pistons which have synchronous cycles, are situated opposite to each other and are acting on the same curved surfaces via one or more rollers arranged on both of their piston rods.

21. The combustion motor according to claim 20, wherein a number of pairs of pistons situated opposite to each other are provided.

22. The combustion motor according to claim 11, wherein the working volume of the expansion chamber is chosen in such a way relative to the volume of the combustion chamber and the working volume of the compressor pump that the pressure of the combustion gas in the expansion chamber during full load operation of the motor immediately before the cooling liquid is sprayed in is below atmospheric pressure.

23. The combustion motor according to claim 22, wherein the pressure of the combustion gas in the expansion chamber during full load operation of the motor immediately before the cooling liquid is sprayed it is below 0.8 times atmospheric pressure.

* * * * *